United States Patent
Kato et al.

(10) Patent No.: US 6,168,100 B1
(45) Date of Patent: Jan. 2, 2001

(54) METHOD FOR PRODUCING EMBOSSED METALLIC FLAKELETS

(75) Inventors: Akira Kato, Mishima; Masatsugu Nakanishi, Numazu; Hidekazu Yamanakajima, Susono; Yoshihiro Yamamura, Nagoya; Yukio Okochi, Toyota; Takatoshi Katsumata, Susono, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/276,528

(22) Filed: Mar. 25, 1999

Related U.S. Application Data

(63) Continuation-in-part of application No. 09/173,185, filed on Oct. 15, 1998, now abandoned.

(30) Foreign Application Priority Data

Oct. 23, 1997 (JP) .................................................. 9-309255
Mar. 31, 1998 (JP) ................................................ 10-103300

(51) Int. Cl.⁷ .................................................. B02C 19/18
(52) U.S. Cl. .................................................. 241/1
(58) Field of Search .................... 241/1, 301, 65, 241/23, 3; 72/414, 340, 324

(56) References Cited

U.S. PATENT DOCUMENTS

| | | |
|---|---|---|
| 2,839,378 | 6/1958 | McAdow . |
| 3,446,169 | 5/1969 | Heldenbrand . |
| 3,765,940 | 10/1973 | Hentzchel . |
| 4,154,901 | 5/1979 | Sigsbee . |
| 4,321,087 | 3/1982 | Levine et al. . |
| 4,754,012 | 6/1988 | Yoldas et al. . |
| 4,758,003 | 7/1988 | Goldstein et al. . |
| 4,874,137 | 10/1989 | Chiba . |
| 4,971,841 | 11/1990 | Panush et al. . |
| 5,116,703 | 5/1992 | Badesha et al. . |
| 5,325,580 | 7/1994 | Gruber et al. . |
| 5,480,231 | 1/1996 | Sasaki et al. . |
| 5,500,311 | 3/1996 | King et al. . |
| 5,577,669 | 11/1996 | Vujnovic . |
| 5,624,076 | 4/1997 | Miekka et al. . |
| 5,629,185 | 5/1997 | Stanzl et al. . |
| 5,650,248 | 7/1997 | Miekka et al. . |
| 5,672,410 | 9/1997 | Miekka et al. . |
| 5,819,579 | 10/1998 | Roberts . |
| 5,849,369 | 12/1998 | Ogawa . |
| 5,851,602 | 12/1998 | Law et al. . |
| 5,980,992 | 11/1999 | Kistner et al. . |

FOREIGN PATENT DOCUMENTS

| | | |
|---|---|---|
| 55-160060 | 12/1980 | (JP) . |
| 4-101900 | 4/1992 | (JP) . |
| 5-232853 | 9/1993 | (JP) . |
| 6-24199 | 2/1994 | (JP) . |
| 6-51682 | 2/1994 | (JP) . |
| 8-502301 | 3/1996 | (JP) . |
| WO 89/01016 | 2/1989 | (WO) . |
| WO 93/23481 | 11/1993 | (WO) . |

*Primary Examiner*—Mark Rosenbaum
(74) *Attorney, Agent, or Firm*—Oliff & Berridge, PLC

(57) ABSTRACT

An improved method of preparing embossed metallic flakelets for a hologram pigment improves productivity through a simpler process. A metallic foil 12 is first pressed between a cooperative pair of dies 10 having mutually complementary embossed patterns to thereby transfer to the surfaces of the metallic foil 12 the embossed pattern of the dies 10. Finally, the pulverized metallic flakelets are mixed with predetermined other ingredients to make a hologram pigment.

12 Claims, 8 Drawing Sheets

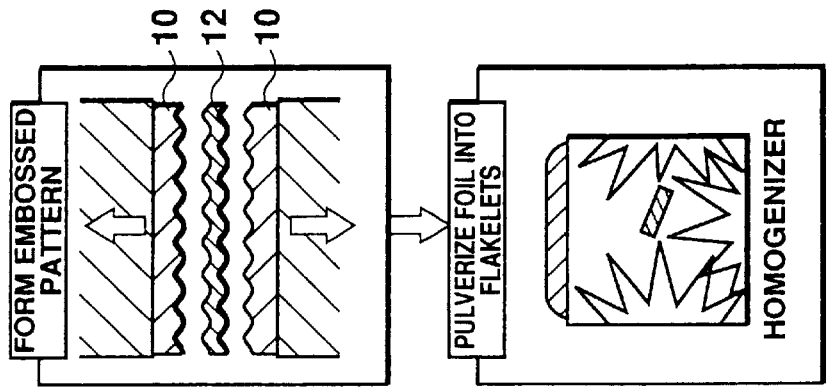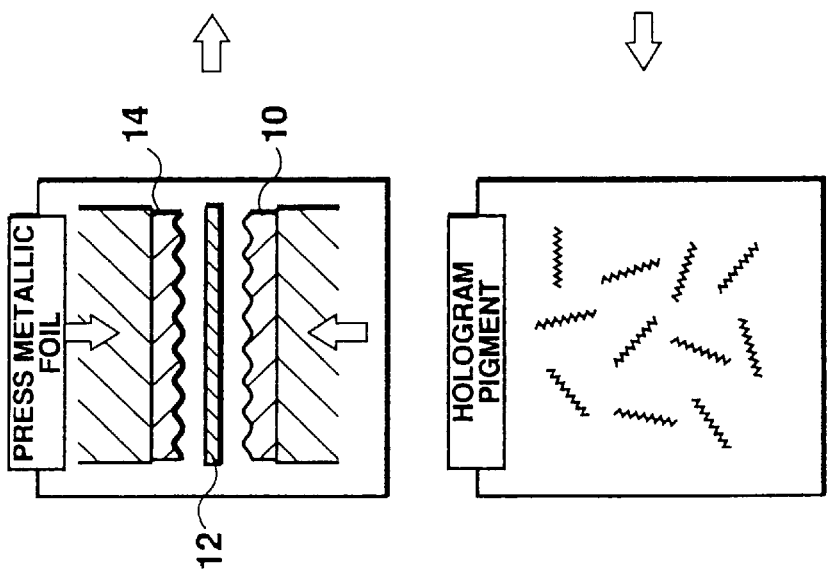

CONDITION A    CONDITION B

METHOD FOR PRODUCING EMBOSSED METALLIC FLAKELETS

This is a Continuation-in-Part of application Ser. No. 09/173,185 filed Oct. 15, 1998 now abandoned.

BACKGROUND OF THE INVENTION

1. Field of the Invention

The present invention relates to an improved method for producing embossed metallic flakelets to be used as a hologram pigment.

2. Description of the Related Art

Metallic flakelets having emboss patterns have conventionally been known as the material of a hologram pigment. For example, Japanese Patent National Publication of Translated Version No. Hei 8-502301 discloses a method of producing a metallic flake pigment with an embossed pattern. This prior method will be described briefly with reference of FIG. 8 of the accompanying drawing of the present specification. In the FIG. 8, a peel coating 52 soluble in a predetermined solvent is formed over an embossed surface of a carrier sheet 50 having emboss patterns at least one surface. The thickness of the peel coating 52 is uniformed by applicator 54. On this peel coating 52, a metallic film is adhered in such manner that the emboss patterns of the carrier sheet 50 is copied onto the metallic film. Then, the peel coating 52 is dissolved in a p redetermined solvent, whereupon the metallic film on which the emboss patterns have been formed is peeled off. The resulting embossed metallic film is then pulverized into embossed metallic flakelets whose average size is within the range of 25 $\mu$m to 50 $\mu$m. The pigment is produced using the thus prepared flakelets.

However, this prior method includes indispensable steps of forming the peel coating 52 over the embossed surface of the carrier sheet 50, forming the metallic film over the peel coating 52, dissolving the peel coating 52 to peel off the metallic film, and then pulverizing the peeled metallic film into flakelets. As a consequence, the whole producing process is extensive and meticulous, thus deteriorating the productivity. Especially in the process step in which the metallic film is adhered onto the peel coating 52, it requires evaporation after vacuum drawing in a vacuum container, which additionally needs a vacuum exhaust facility, and also it takes long time to form the metallic film. Further, in the peeling step, the peeling coating 52 is dissolved using, for example, a solvent. Accordingly the whole producing process is considerably complex, from which unexpected cost saving could not be expected.

SUMMARY OF THE INVENTION

An object of the present invention is to provide a method for producing embossed metallic flakelets which improves the productivity, simplifies processing steps, and ultimately reduces production costs.

In order to accomplish the above object, according to the present invention, there is provided a method of producing embossed metallic flakelets, wherein a metallic foil is pressed on its opposite surfaces between a cooperating pair of dies, which respectively have two mutually complementary embossed pattern, to thereby form on the surfaces of the metallic foil undulations corresponding to the embossed pattern of the dies.

It may be preferable for the method to comprise steps of soaking the metallic foil, which has been pressed into a thickness of less than 2 $\mu$m and left adhered to the dies, in a liquid; and pulverizing the soaked metallic foil into metal flakelets of an size of less than 50 $\mu$m by applying ultrasonic waves to the metallic foil simultaneously with removing the metallic foil from the dies.

In another preferred aspect, the liquid has a surface tension of less than 0.04 N/m.

According to still another preferred aspect, the metallic foil is previously cooled to a temperature equal to or less than −50° C. during the pulverizing step.

According to a further preferred feature, the metallic foil is heated during the pressing.

It may also be preferable for the dies and/or the metallic foil to be surface-treated so as to have a low surface energy before pressing step.

As an additional preference, the metallic foil may have pin holes of a size equal to or less than 10 nm at a density of 800 to 9,000 holes per mm$^2$.

However, it may also be preferable for the method to comprise steps of applying a surface active agent over the pressed metallic foil; and then pulverizing the metallic foil into metallic flakelets by applying ultrasonic waves to the metallic foil while being soaked in a liquid.

In another aspect of the present invention, the dies are pressed against both sides of the metallic foil while gradually receiving pressure via reduction rolls.

The reduction rolls may rotate in the same direction as the longitudinal direction of the embossed metallic flakelets.

In addition, tensile stress absorbing plates may be disposed between the reduction rolls and the dies.

BRIEF DESCRIPTION OF THE DRAWINGS

FIGS. 1(*a*) though 1(*d*) show a succession of process steps of a method for producing embossed metallic flakelets according to the present invention;

DESCRIPTION OF THE PREFERRED EMBODIMENT

Embodiment 1

The principles of the present invention are particularly useful when applied to a method of producing embossed metallic flakelets (hereinafter simply called the method), a preferred embodiment of which will now be described with reference to the accompanying drawings.

FIGS. 1(a) through 1(d) show a succession of process steps of the method according to the present invention. In FIG. 1(a), a metallic foil 12 such as an aluminum foil is pressed on its opposite surfaces between cooperative upper and lower dies 10 in a form such as nickel master templates having on their confronting surfaces mutually complementary embossed pattern. As a result, as shown in FIG. 1(b), undulations corresponding to the embossed pattern of the dies 10 are formed on the surfaces of the metallic foil 12. At that time, the pressure needed for pressing the metallic foil 12 is at least 550 MPa at the surface if the metallic foil 12 is aluminum. A hypothetical pressure less than this figure will lead to inadequate embossed pattern formation. The substance of the dies 10 is by no means limited to nickel (Ni), and may also be iron (Fe), tungsten (W), or any other material suitable for machine tools.

Then, as shown in FIG. 1(c), the embossed metallic foil 12 obtained in the process step of FIG. 1(b) as left adhered to the dies 10 is soaked in a predetermined liquid, and ultrasonic waves are applied to the metallic foil 12 by a homogenizer to remove the metallic foil 12 off the dies 10 and, at the same time, to pulverize the metallic foil 12 into flakelets of a size less than 50 $\mu$m. By the foregoing process steps, as shown in FIG. 1(d), the embossed metallic flakelets to be used as the material of a hologram pigment are thus produced. Predetermined ingredients are added to the metallic flakelets to obtain a hologram pigment.

The thickness of the metallic foil 12 to which the embossed pattern are to be formed is preferably less than 2.0 $\mu$m because a thickness larger than this will cause light to reflect off the relatively thick edges of the flakelets and make the pigment undesirably white, thereby deteriorating its quality as a hologram pigment. Another problem with larger thicknesses for the metallic foil 12 is that the metallic foil 12 will become difficult to pulverize into flakelets.

The pulverizing of the metallic foil 12 after pressing is performed by applying ultrasonic waves in an acetone solvent and the size of the flakelets after pulverizing should desirably not exceed 50 $\mu$m. If flakelet size exceed this figure, the individual flakelets will become curled so that a finished surface coated with the hologram pigment could not be made sufficiently. Another problem with a larger average size for the flakelets is that the hologram pigment will be jammed in a spray gun or the like in a subsequent coating process.

Figure 2:
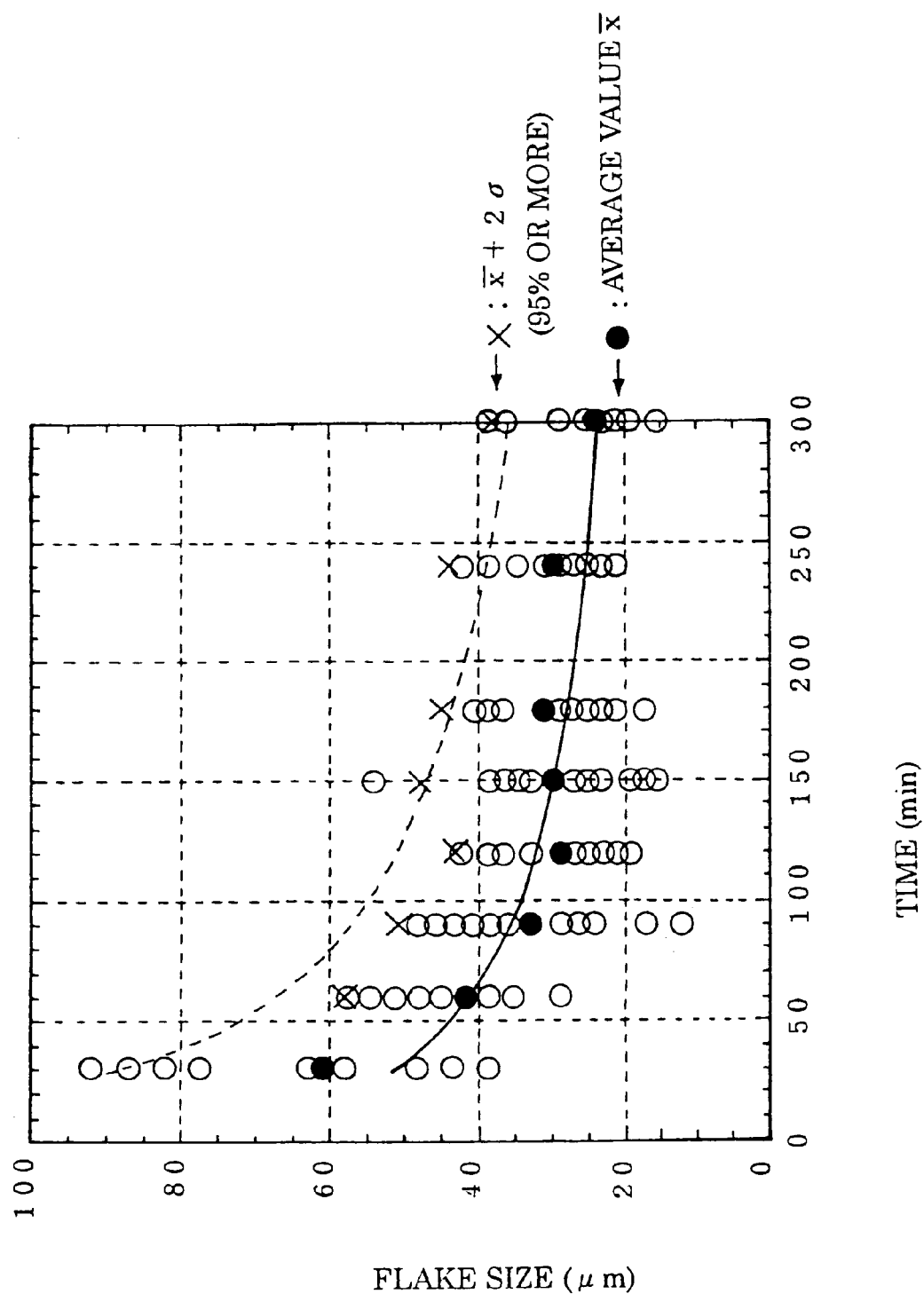
FIG. 2 is a graph showing a relationship between the time to be taken to pulverize a metallic foil into flakelets under application of ultrasonic waves and the size of the flakelets after pulverizing.

FIG. 2 shows a relationship between the average size of the flakelets after pulverizing and the time ultrasonic waves had been applied to the metallic foil, when a 0.4 $\mu$m thick aluminum foil as the metallic foil 12 was pulverized in acetone as exposed to ultrasonic waves. In FIG. 2, * stands for an average value of the measured sizes of the flakes, and × stands for a value that assumes 2σ (a range covering 95% or more of the flakes). It turns out from FIG. 2 that at least approximately 150 minutes of pulverizing time is required for more than 95% of the whole flakes not to exceed 50 $\mu$m in size.

Figure 3:
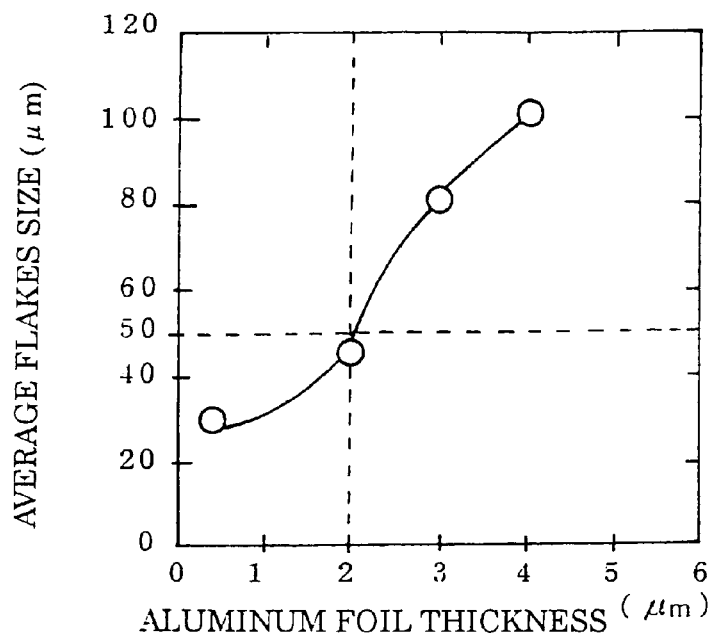
FIG. 3 is a graph showing a relationship between the thickness of aluminum foil used as a metallic foil and the average size of the flakelets after pulverizing.

FIG. 3 shows a relationship between the thickness of an aluminum foil used as the metallic foil 12 and the average size of the flakes after the pulverizing, when 150 minutes was adopted as the pulverizing time. Assuming that the pulverizing time is 150 minutes, the thickness of the aluminum foil must be less than 2 $\mu$m in order that the flakes not exceed an average size of 50 $\mu$m.

Therefore, in order to ensure the flakelet size of less than 50 $\mu$m to improve the quality of the hologram pigment and to prevent the hologram pigment from jamming in a spray gun, it is preferable that the thickness of the metallic foil 12 which has embossed pattern should be less than 2 $\mu$m.

When the thickness of the metallic foil 12 is within a range from 0.4 to 1 $\mu$m, the directivity of the embossed pattern of the upper and lower dies 10 is preferably parallel. If not parallel, the protuberances and dents of the confronting embossed pattern of the upper and lower dies 10 interfere to create embossed-pattern-free local areas on the surfaces of the metallic foil 12 where interference light will be diffused when such a foil as used to create a hologram pigment. On the other hand, when the directivity of the emboss patterns of the upper and lower dies 10 is parallel, no embossed-pattern-free local area is created on the metallic foil 12 and interference light will become intense when used as a hologram pigment.

Additionally, when the metallic foil 12 is removed from the dies 10 as exposed to ultrasonic waves, disturbances will occasionally occur on the surfaces of the metallic foil 12, which would be a cause for diffusing the interference light when it is used as a hologram pigment. To retard these possible disturbances on the surfaces of the metallic foil 12 while removing the dies 10 and to ensure the intensity of the interference light, it is necessary to improve the peelability of the metallic foil 12 from the dies 10 after being pressed between the dies 10. For this purpose, it is preferred that the dies 10 and/or the metallic foil 12 be surface-treated to have a low surface energy. Experimental results for surface-treated dies 10 are shown in Table 1. The results when the metallic foil 12 was surface-treated are shown in Table 2.

TABLE 1

| SURFACE TREATMENT ON PRESS DIES | SURFACE ENERGY | INTERFERENCE COLOR |
|---|---|---|
| $CF_3(CF_2)_7Si(OCH_3)_3$ | 0.015N/m | ⊚ |
| $C_2H_5Si(OCH_3)_3$ | 0.04N/m | ⊚ |
| Nil | 0.1/m or more | ○ |

TABLE 2

| SURFACE TREATMENT ON METAL FOIL | SURFACE ENERGY | INTERFERENCE COLOR |
|---|---|---|
| $CF_3(CF_2)_7Si(OCH_3)_3$ | 0.015N/m | ⊚ |
| $C_2H_5Si(OCH_3)_3$ | 0.04N/m | ⊚ |
| Nil | 0.1/m or more | ○ |

In the tests, $CF_3(CF_2)_7Si(OCH_3)_3$ and $C_2H_5Si(OCH_3)_3$ were used as the surface-treating agent (remover), and as a comparative example, the metallic foil 12 was also pressed between the dies without surface-treating. In Tables 1 and 2, the surface energy when the dies 10 or the metallic foil 12 was surface-treated with $CF_3(CF_2)_7Si(OCH_3)_3$ was 0.015 N/m, and that when it was surface-treated with $C_2H_5Si(OCH_3)_3$ was 0.04 N/m; in either test, the surface energy was lowered compared to that of the comparative example in which no surface-treating was carried out. Consequently, in both tests, the interference color was improved. Symbol ⊚ in Tables 1 and 2 indicates that the interference color was remarkably good as interference light was become intense as compared to the comparative example in which no surface-treating was carried out with the interference color evaluated as decent as indicated by symbol ○ in Tables 1 and 2. The surface-treating was carried out by firstly soaking the dies 10 or the metallic foil 12 in a 2% solution of the remover listed in Tables 1 and 2 and then heating the dies 10 or the metallic foil 12 to 80° C.

In particular, when the metallic foil 12 is surface-treated, the metallic foil 12 is more peelable from the dies 10, and consequently the interference color is improved, as shown in Table 2. Furthermore, pulverizability and dispersiveness can also be improved, because surface-treated flakes do not stick to each other during pulverization or after pulverization.

Further when the metallic foil 12 is pressed, for example, if an aluminum foil is used, heating up to 300° C. was able to improve the transferability of the embossed pattern as compared to the case in which pressing is carried out at room temperature. Thus pressing at 300° C. can achieve a more intense interference light than pressing at room temperature.

Figure 4:
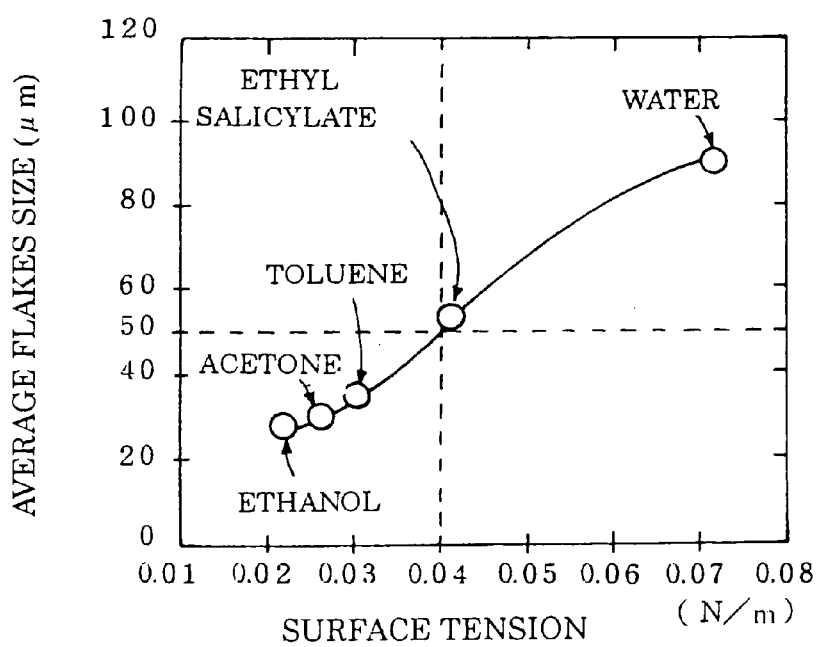
FIG. 4 is a graph showing relationships between the surface tensions of various kinds of liquids each to be used in pulverizing a metallic foil into flakelets and the average size of the flakelets after the pulverizing.

As described above, pulverizing of the metallic foil 12 is carried out by first soaking the metallic foil 12 in a predetermined liquid while the metallic foil 12 is left adhered to the dies 10 and then applying ultrasonic waves to the metallic foil 12. Using this method, it is possible to simultaneously remove the metallic foil 12 from the dies 10 and pulverize the metallic foil 12 into flakelets. The liquid to be used in this method may an organic solvent such as acetone or ethanol, and is preferably has a surface tension less than 0.04 N/m. FIG. 4 shows a relationship between the average size of the flakelets when pulverizing of the metallic foil 12 was carried out for 150 minutes as exposed to ultrasonic waves and the surface tension of the liquid used in that pulverizing. As shown in FIG. 4, when water whose surface tension is approximately 0.07 N/m is used as the liquid, the average size of the obtained flakelets was approximately 90 μm, which largely exceeded the preferred flakelet size of at most 50 μm for use as a hologram pigment. On the other hand, when various organic solvents whose surface tensions are less than 0.04 N/m were individually used as the liquid, in each test, the average size of the obtained flakelets was less than 50 μm. In the case of ethyl salicylate whose surface tension is about 0.04 N/m, the average size of the obtained flakes was about 50 μm. It is understood from the foregoing that the preferable surface tension of a liquid to be used in pulverizing the metallic foil 12 is less than 0.04 N/m. As oil adhered to the surface of the metallic foil 12 as of aluminum may play a role in obstructing pulverizing by ultrasonic waves, a liquid capable of dissolving oil will facilitate pulverizing the metallic foil 12 by ultrasonic waves. Such liquid capable of dissolving the oil and of wetting the surfaces of the metallic foil 12 may be the one whose surface tension is less than about 0.04 N/m.

As an alternative method, when the metal foil 12 made of aluminum was precooled before being pulverized by ultrasonic waves, undulations of the obtained flakelets after pulverizing were kept small as compared to the case of pulverizing at room temperature so that the interference light could be increased when it is used as a hologram pigment. Presumably, precooling the metallic foil 12 might make it vulnerable and facilitate pulverizing. Further, when the metallic foil 12 was precooled to less than −50° C., the metallic foil 12 became hard and was retarded from deforming while being removing from the dies 10 to make the undulation of the obtained flakelets small.

Table 3 shows various interference color tests when the temperature at which the metallic foil 12 was precooled varied. In Table 3, as in Tables 1 and 2, symbol ⊚ indicates that the interference color was remarkably good as compared to the comparative example with the interference color evaluated as decent as indicated by symbol ○.

TABLE 3

| CONTENTS | TEMPERATURE | INTERFERENCE COLOR |
|---|---|---|
| ACETONE | ROOM TEMPERATURE | ○ |
| ICE + SALT SOLUTION | −20° C. | ○ |
| ETHANOL + DRY ICE | −40° C. | ○ |
|  | −60° C. | ⊚ |

As shown in Table 3, the interference color when the metallic foil 12 was cooled down to −60° C. using ethanol plus dry ice was remarkably superior to that as cooled down to −40° C. also using ethanol plus dry ice. Therefore, the metallic foil 12 should be precooled to at least −50° C.

Then, as mentioned above, the size of the flakelets is preferably less than 50 μm. If the average size is less than 15 μm, sufficient interference colors cannot be obtained as a hologram pigment. Therefore the size of the obtain flakelets is preferably within the range from 15 μm to 50 μm. A way of controlling this flakelet size will next be described.

Figure 5:
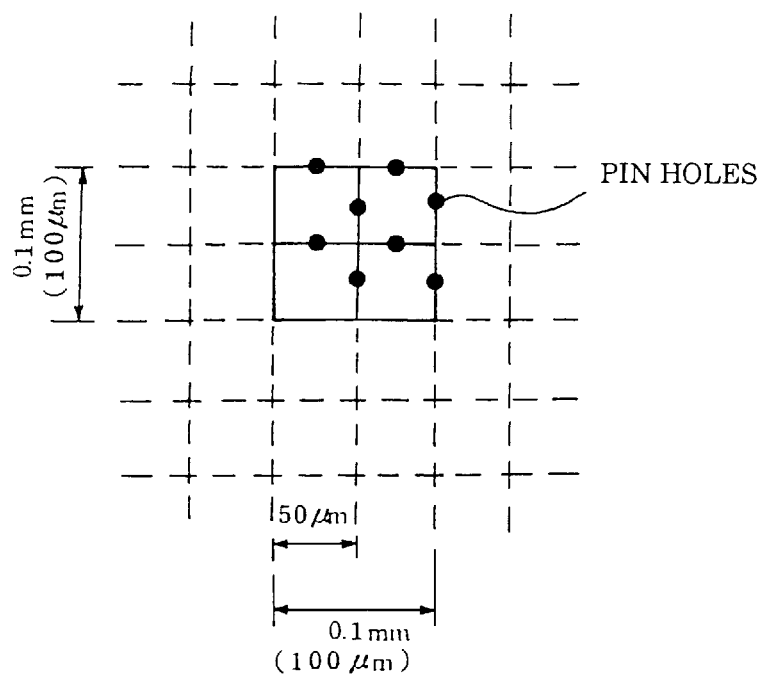
FIG. 5 is a diagram showing an arrangement of pin holes in aluminum foil.

An aluminum foil to be used as the metallic foil 12 has pin holes whose diameter is generally 10 μm or less. It is presumed that, when this aluminum foil is pulverized by ultrasonic waves, the pin holes play to propagate cracks throughout the aluminum foil, thus pulverizing the foil into flakelets. Therefore, by limiting the number of pin holes to within a suitable range, it is possible to regulate the size of the flakelets to a predetermined value. As shown in FIG. 5, assuming a square region whose one side length is 0.1 mm (100 μm), four of flakes whose one side is 50 μm may enter the square region. In order to pulverize the foil into flakes such that one side of each flake is 50 μm, it is convenient that a single pin is disposed in one side of the flake. Since each flake shares one side one with each of four neighboring flakes, mathematically, an average of two pin holes are required for each single flake. Consequently eight pin holes are associated with a region whose one side length is 0.1 mm. Therefore, in an area of 1 mm², the number of pin holes is one hundred times the above figure. This may be expressed by a general equation:

$$2 \times \left(\frac{100}{d(\mu m)}\right)^2 \times 100 = N \qquad \text{EQUATION 1}$$

where d is the size of flakes and N is the preferable number of pin holes to be disposed in an area of 1 mm² of the aluminum foil.

As already mentioned, when the flakes is 50 μm or larger. The hologram pigment may jam in a spray gun or in a subsequent coating process, and, if 15 μm or smaller, sufficient interference light cannot be obtained. Accordingly, flake size is preferably in a range of 15 μm to 50 μm. The number of pin holes for obtaining a flake size of 50 μm can be obtained from Equation 1 above; the figure obtained is 800. For a flake size of 15 μm, a figure of approximately 9,000 is obtained from Equation 1.

Figure 6:
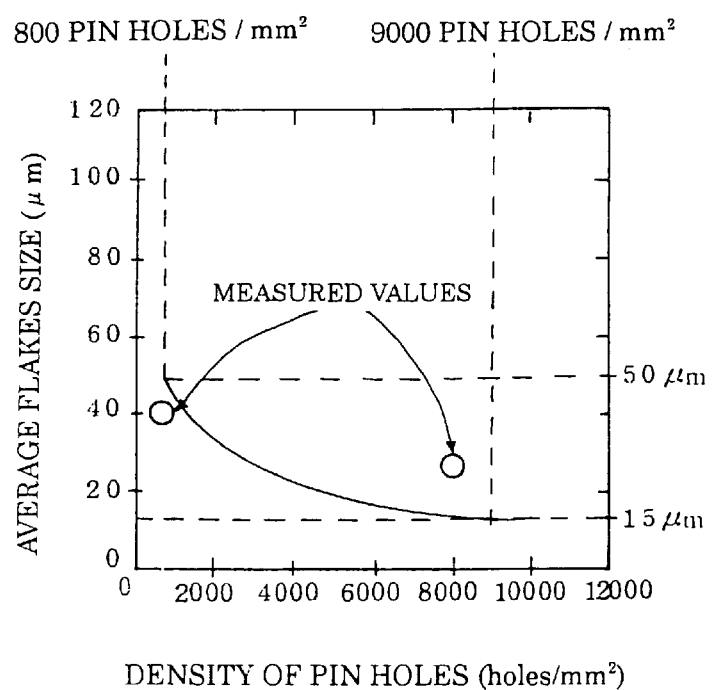
FIG. 6 is a graph showing a relationship between the number of pin holes in an aluminum foil to be pulverized into flakelets and the average size of the flakelets after pulverizing.

FIG. 6 shows a relationship between the number of pin holes in an aluminum foil and the average size of the flakes obtained when the aluminum foil is pulverized. In FIG. 6, a curve of Equation 1 is indicated by a solid line; measured values are indicated by points. These measured values are those obtained from actual measurements when the pulverizing of the aluminum foil was carried out under conditions as shown in FIG. 2. Specifically, a 0.4 μm thick aluminum foil was pulverized in acetone by applying ultrasonic waves to the foil for 150 minutes. It can be understood from FIG. 6 that if the number of pin holes is within the range of 800 to 9,000, the average size of the flakelets assumes a figure within the range of 15 μm to 50 μm.

This pin hole density can be controlled commensurate with the manner in which an aluminum sheet is hammered into a foil form during an aluminum-foil producing process.

Figure 7:
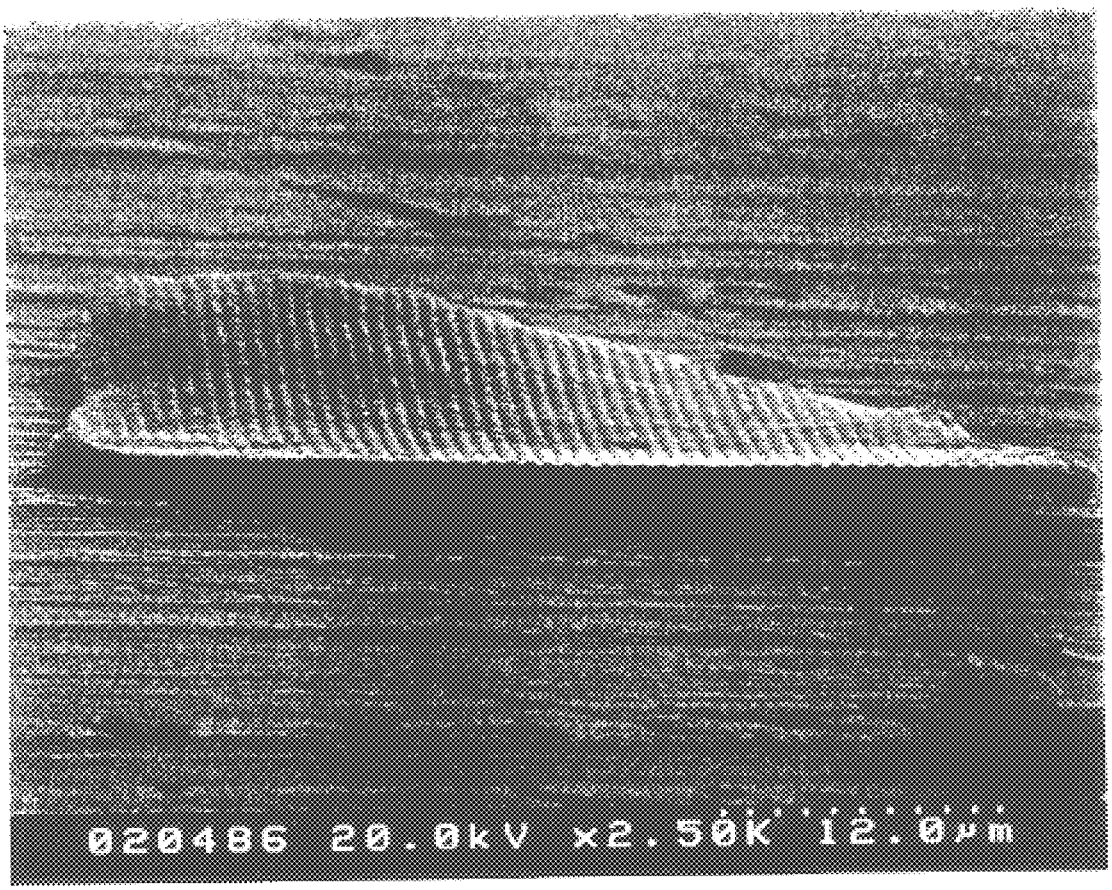
FIG. 7 is an electron-microscopic photograph of the flakelets after the pulverizing.
Figure 8:
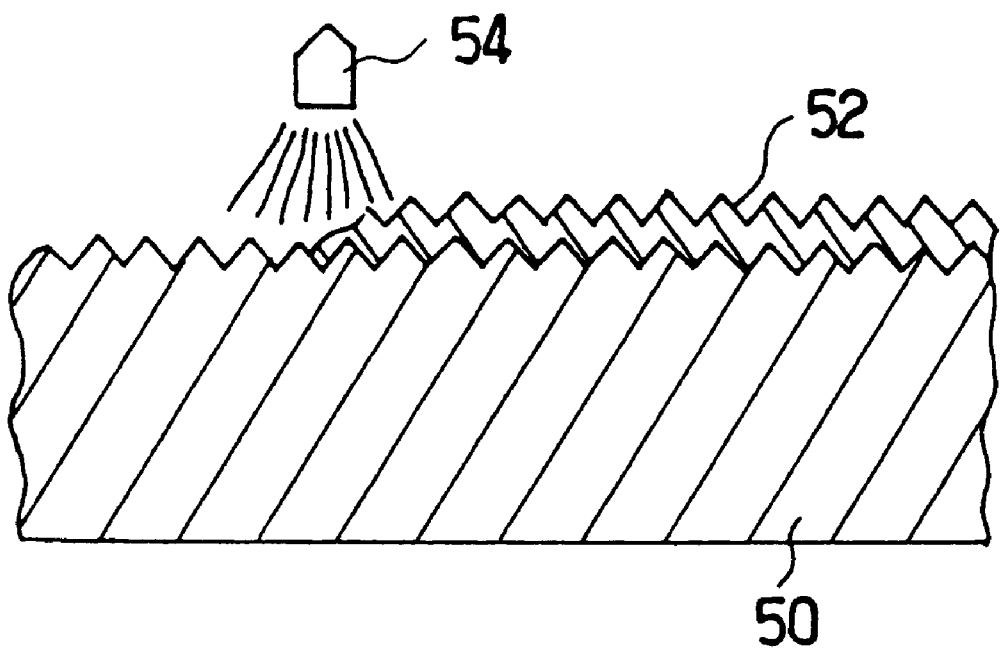
FIG. 8 is a diagram showing a conventional method of producing a pigment of metallic flakelets with embossed pattern.

The result of observing the thus obtained flakelets with a scanning electron microscope is shown in FIG. 7. It is apparent from FIG. 7 that the flakelets were confirmed as having the same embossed pattern as that of the master templates dies 10. It was also observed that those flakelets would produce a good diffraction effect and could be used as the material of an embossed metallic pigment.

The thus obtained flakelets were selected by a sieve, and only flakelets of 25–45 μm in size were obtained. The selected flakelets were then blended with other ingredients in blending combination of the composition of Table 4 to create a clear lacquer.

TABLE 4

| INGREDIENTS | BLENDED AMOUNTS |
| --- | --- |
| HOLOGRAM PIGMENT | 0.03 g |
| ACRYL MELAMINE RESIN | 150 cc |
| THINNER | 50 cc |

The clear lacquer blended with the thus produced hologram pigment was coated over a color base of a plate, which is to be color-painted, by a spray gun. This coating was fixed at 140° C. for 20 minutes. After coating, the individual flakelets on the coated plate produced a good diffraction optical effect, giving a diffracting embossed pattern on the surface. The resulting coated plate had an extended unique iridescent effect.

Further, in pulverizing the metallic foil 12 into flakelets, when the metallic foil 12 was soaked in acetone after a surface active agent such as oleic acid has been coated over the metallic foil 12, and when ultrasonic waves was applied to the metallic foil 12 in acetone, an improved homogeneous dispersion of the embossed flakelets as achieved when the resulting embossed flakelets was blended with other ingredients in blending combination of the composition of Table 4. If this surface active agent is added after pulverizing by the ultrasonic waves, falling of the flakelets due to the gravitational segregation often occurred. As an alternative of oleic acid, stearic acid may be used as this surface active agent.

Embodiment 2

Figure 9:
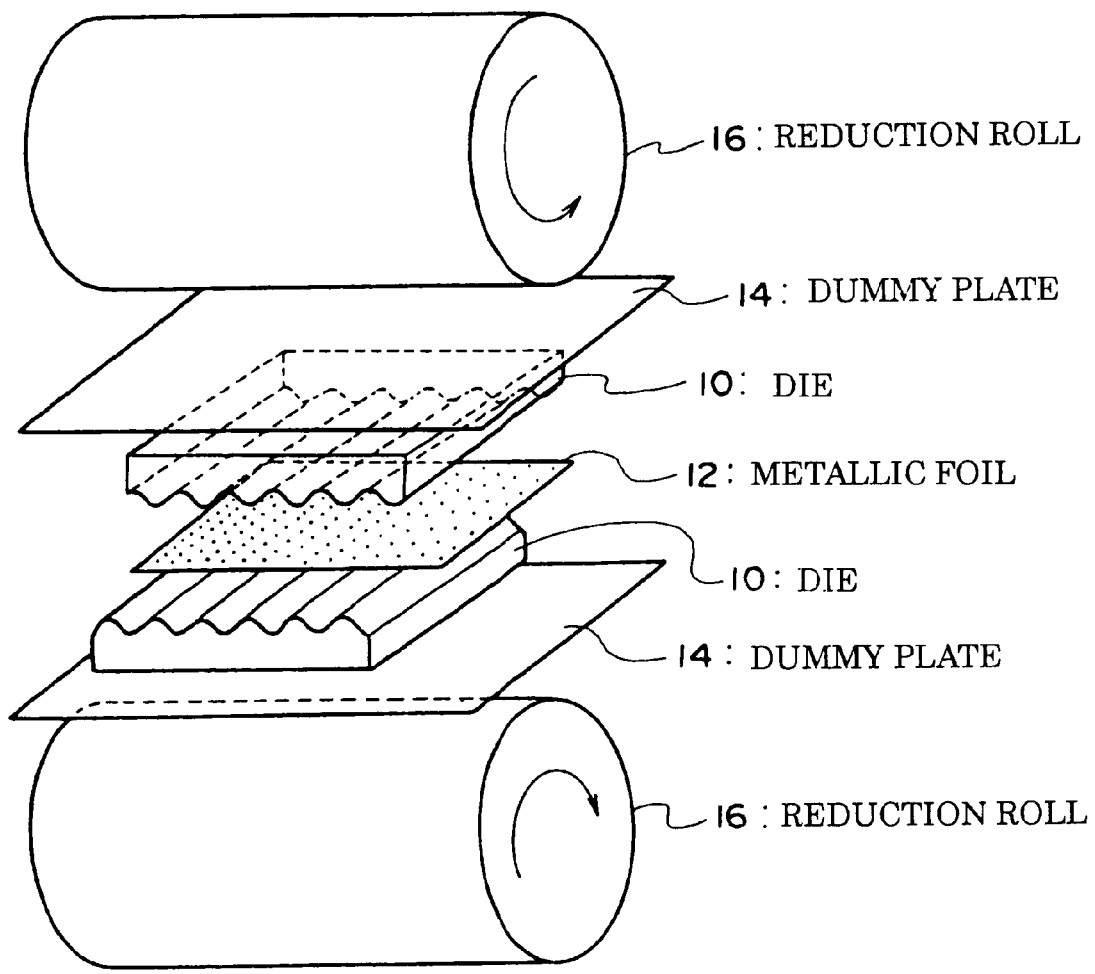
FIG. 9 is a schematic diagram showing an apparatus used for the method of producing the embossed metallic flakelets according to a second embodiment of the present invention.

FIG. 9 shows an apparatus used in a method of producing embossed metallic flakelets according to a second embodiment of the present invention. In FIG. 9, the metallic foil 12 is sandwiched between upper and lower dies 10 having embossed patterns, which are, in turn, sandwiched by upper and lower dummy plates 14 serving as tensile stress absorbing plates. Reduction rolls 16 exert pressure on the dummy plates 14 from the upper and lower sides causing the dies 10 to press against both sides of the metallic foil 12 while gradually exerting pressure across the dummy plates 14 by the reduction rolls 16. As a result, the embossed patterns formed on the surface of the dies 10 are transferred to both sides of the metallic foil 12.

An advantage of disposing the dummy plates 14 between the reduction rolls 16 and the dies 10 is that risk of deformation of the dies 10 due to the tensile stress as caused by an excessive pressure when dies 10 are directly pressed by the reduction rolls 16 is avoided. Deformation of the dies 10 may cause a corresponding deformation of the embossed patterns formed on the surface of the dies 10, causing each of the embossed patterns to be pulled in the lateral direction of the dies 10. If such embossed patterns are transferred to the metallic foil 12, interference light will be weaker. To solve this problem, the dummy plates 14 are arranged as shown in FIG. 9 so that they receive the pressure from the reduction rolls 16 and deform thereby protecting the dies 10 intact so that the embossed patterns can be transferred to the metallic foil 12 without any deformation. As such, the dummy plates 14 function to prevent deterioration of the interference color caused by deformation of the dies 10 due to the flattened embossed patterns. In this respect, other members may be used instead of the dummy plates 14 as long as they can disperse the pressure from the reduction rolls 16 onto the entire rear surface of the dies 10 or absorb the tensile stress by changing shapes by themselves. For example, an iron plate or another elastic material may be used.

Figure 10:
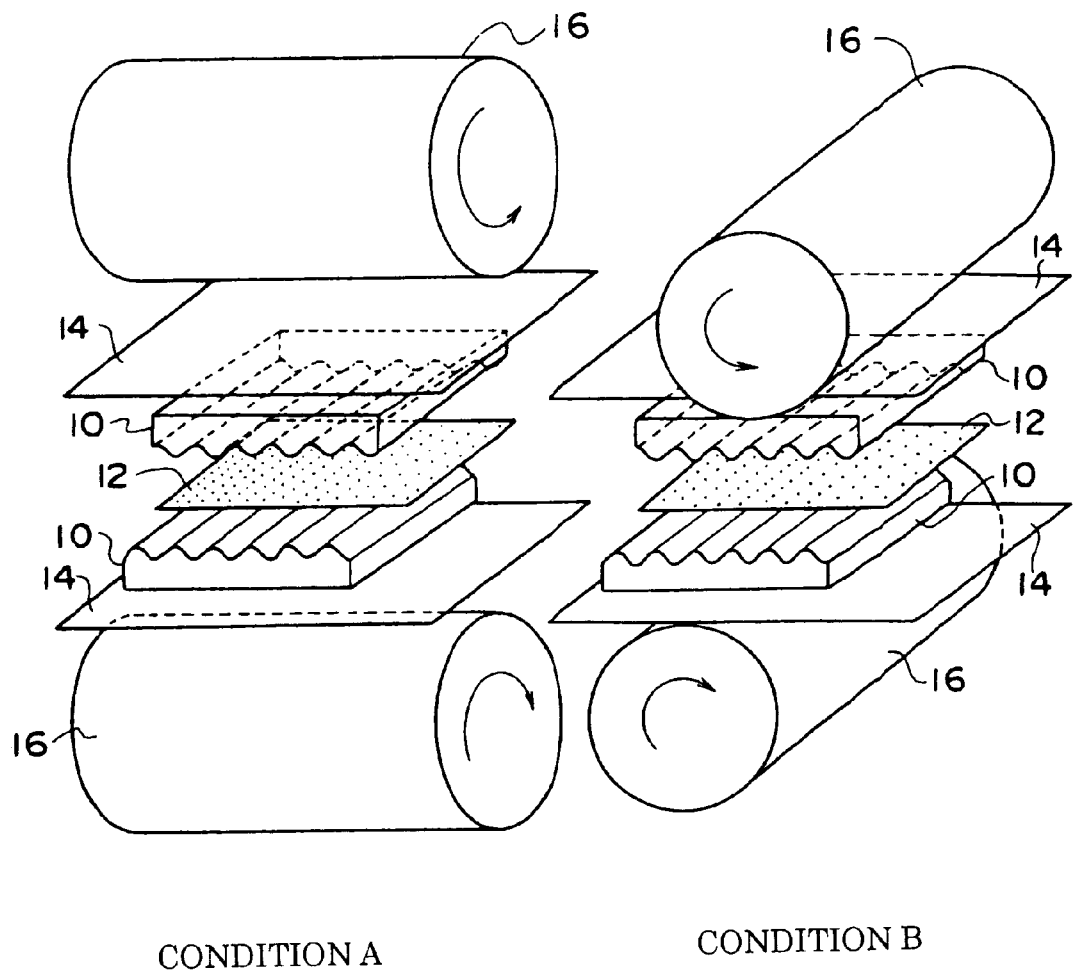
FIG. 10 shows the rotational direction of individual reduction rolls relative to the longitudinal direction of the embossed pattern of the dies.

Two methods (i.e., Conditions A and B) are available to exert pressure on the dies 10 via the dummy plates 14, as shown in FIG. 10. Under Condition A, the direction of rotation of the reduction rolls 16 is in agreement with the longitudinal direction in which the grooves of the embossed patterns are formed on the surface of the dies 10. In contrast, under Condition B the rotational direction of the reduction rolls 16 is at 90 degrees relative to the longitudinal direction of the grooves of the embossed patterns on the surface of the dies 10. Of these two conditions, resulting hologram pigment showed a better interference color when the dies 10 were pressed against the metallic foil 12 under the Condition A because each of the embossed patterns is pulled in the lateral direction of the dies 10 under the Condition B by the rolling operation of the reduction rolls 16, and such embossed patterns can not sufficiently be transferred to the metallic foil 12 thereby weakening interference color. In contrast, under Condition A, the rolling operation of the reduction rolls 16 does not influence the undulation of the embossed patterns on the surface of the dies 10, so that the resulting interference color of the hologram pigment will not be deteriorated.

Table 5 shows the observation results of the interference color of the hologram pigment produced under Conditions A and B.

TABLE 5

| Direction of rolling vs. direction of the embossed pattern | Interference Color |
| --- | --- |
| Condition A | ⊙ |
| Condition B | ○ |

⊙ indicates excellent interference color, superior to the interference color under the other condition.

As can be seen from the Table 5, the interference color was further enhanced under the Condition A beyond the results for Condition B and an excellent hologram pigment was realized.

A specific example of a hologram pigment produced according to the method of producing embossed metallic flakelets of this embodiment will next be described.

An aluminum foil having a thickness of 1 μm was used as the metallic foil 12, and embossed nickel master plates having a thickness of 130 μm were disposed as the dies 10 so as to sandwich the aluminum foil 12. The dies 10 were then sandwiched by the 1 mm dummy plates 14 made of iron and rolled by the reduction rolls 16 as shown in FIG. 9. It should again be noted that the dummy plates 14 may be made of a material other than iron.

A two-stage reduction roller including reduction rolls 16 made of the bearing steel SUJ-2 and having a diameter of 70 mm and a width of 120 mm were used. A peripheral speed of the rolls was 1 m/min. The size of the aluminum foils, the nickel master plates, and the iron plates used as the dummy plates 14 was 70 mm by 150 mm. The total thickness of the aluminum foils, the nickel master plates, and the iron plates was 2.3 mm when stacked, as shown in FIG. 9. The target distance between the reduction rolls 16 was 1.6 mm to secure a draft rate of about 30% at an applied load of about 8 ton. The reduction rolling was carried out at room temperature and a surface pressure of 600 Mpa was applied. When the metallic foil 12 is made of aluminum, a surface pressure of 550 MPa or more is required at room temperature, otherwise the embossed patterns will be insufficiently transferred. In this way, the embossed patterns were transferred to both sides of the aluminum foil. It should be noted that the dies 10 may be made of a metal such as iron, tungsten, or tool steel, as well as nickel.

The resulting aluminum foil having embossed patterns transferred to both sides showed the optical effect of diffraction, and embossed optical patterns could be observed on its surfaces.

Next, the rolled aluminum foil, which was left attached to the nickel master plates serving as the dies 10, was immersed in acetone and exposed to ultrasonic waves by a homogenizer (an ultrasonic washer). When the aluminum foil having a thickness of 1 μm was subjected to ultrasonic pulverization in acetone for 150 minutes, resulting flakelets included more than 95% of flakes having a particle diameter of less than 50 μm, a preferable particle diameter for hologram pigment. The pulverized flakes were observed using scanning electron and laser microscopes, which revealed that each flake had the same embossed patterns as the master plates and that all flakes had a common diffraction effect.

The thus prepared flakes (or hologram pigment) were filtered to obtain flakes having a diameter of 25–45 μm. Then, a clear was prepared by mixing 0.03 g of the resulting flakes with 150 cc acrylic melamine resin and 50 cc thinner. The obtained clear was coated on a color base as the painting plate using a spray gun and was left for 20 minutes after coating at 140° C. for fixing the clear containing hologram pigment.

After coating, each flake on the painting plate continued to show the optical effect of diffraction and the diffraction pattern corresponding to the embossed patterns was observed on the surface. Thus, the prepared painting plate created a unique irridescent effect.

As mentioned above, according to the present invention, since embossed patterns are directly pressed on the metallic foil by the dies 10, it is possible to precisely copy the embossed pattern of the dies 10 onto the metallic foil while productivity can be improved because the method includes only simple process steps.

It may be preferable to first soak metallic foil 12 in a liquid while attached to the dies and then expose it to ultrasonic waves, to thereby ease removal of the metallic foil 12 off the dies and, at the same time, to pulverize the metallic foil 12 into flakelets, and thereby simplify the process steps.

It may also be preferable to increase the surface tension of the liquid to be used in pulverizing, so as to facilitate uniform wetting of the metallic foil and to eliminate the influence of oil or other foreign matter adhered to the dies 10 or the metallic foil 12, and thus minimizing the flakelets in size.

It may also be preferable, by previously cooling the metallic foil 12 before the pulverizing, to reduce the undulations of the flakelets, and thus increase the intensity of the interference light.

It may also be preferable to lower the surface energy of the dies and/or metallic foil 12 and thereby to retard disturbances on the surfaces of the metallic foil 12 when the metallic foil 12 is removed off the dies 10, thus additionally increasing the intensity of the interference light.

It may further be preferable feature to control the number of pin holes in the metallic foil 12 in order to regulate the size of the flakelets to within a required range.

It may also be preferable to pulverize the metallic foil 12 coated with a surface active agent to facilitate uniformly dispersing of the flakelets when the flakelets are used as a hologram pigment, and thus prevent the flakelets from falling due to the gravitational segregation.

It is another advantage of the invention that upper and lower sides of the metallic foil can be effectively pressed with a heavy load using the reduction rolls.

In addition, it is possible to avoid the embossed patterns formed on the surface of the dies being pulled in the lateral direction of the dies during rolling by aligning the direction of rotation of the reduction rolls with the longitudinal direction of the embossed pattern of the dies, so that an excellent interference color of the embossed patterns can be maintained when the patterns are transferred to the metallic foil.

Also, because of the tensile stress absorbing plates disposed between the reduction rolls and the dies, it is possible to restrict the tensile stress exerted on the dies. This also contributes to maintain the excellent interference color of the embossed patterns transferred to the metallic foil.

What we claimed is:

1. A method of producing embossed metallic flakelets, comprising:

pressing a metallic foil on its opposite surfaces between a cooperating pair of dies, which have two mutually complementary embossed patterns, to form on the surfaces of the metallic foil undulation corresponding to the embossed pattern of the dies; and pulverizing the metallic foil into metallic flakelets.

2. A method according to claim 1, further comprising soaking the metallic foil, which has been pressed into a thickness less than 2 μm and left adhered to the dies, in a liquid;

wherein the soaked metallic foil is then pulverized into metal flakelets of a size of less than 50 μm by applying ultrasonic waves to the metallic foil simultaneously with removing the metallic foil off the dies.

3. A method according to claim 2, wherein said liquid has a surface tension less than 0.04 N/m.

4. A method according to claim 1, wherein said metallic foil is cooled to a temperature equal to or less than 50° C. before said pulverizing step.

5. A method according to claim 1, wherein the metallic foil is heated during said pressing.

6. A method according to claim 1, wherein, before the pressing step, the dies and/or the metallic foil is surface-treated to reduce the surface energy between the dies and the metallic foil.

7. A method according to claim 1, wherein the metallic foil has pin holes of a size equal to or less than 10 nm at a density of 800 to 9,000 per mm$^2$.

8. A method according to claim 1, further comprising applying a surface active agent over the pressed metallic foil;

wherein the metallic foil is then pulverized into metallic flakelets by applying ultrasonic waves to the metallic foil while being soaked in a liquid.

9. A method according to claim 1, further comprising pressing the dies against both sides of the metallic foil while gradually applying pressure across the dies through reduction rolls.

10. A method according to claim 9, wherein the direction of rotation of the reduction rolls is the same as the longitudinal direction of the embossed pattern of the dies.

11. A method according to claim 9, wherein a tensile stress absorbing plate is disposed between the reduction rolls and the dies.

12. A method according to claim 10, wherein a tensile stress absorbing plate is disposed between the reduction rolls and the dies.

* * * * *